May 3, 1960 A. ESCHNER, JR 2,935,687

LOGARITHMIC VIDEO AMPLIFIER

Filed Aug. 1, 1956

INVENTOR.
ALBERT ESCHNER, JR.,

BY

ATTORNEY.

2,935,687

LOGARITHMIC VIDEO AMPLIFIER

Albert Eschner, Jr., Culver City, Calif., assignor to Hughes Aircraft Company, Culver City, Calif., a corporation of Delaware Application August 1, 1956, Serial No. 602,487
8 Claims. (Cl. 328—145)

Figure 1:
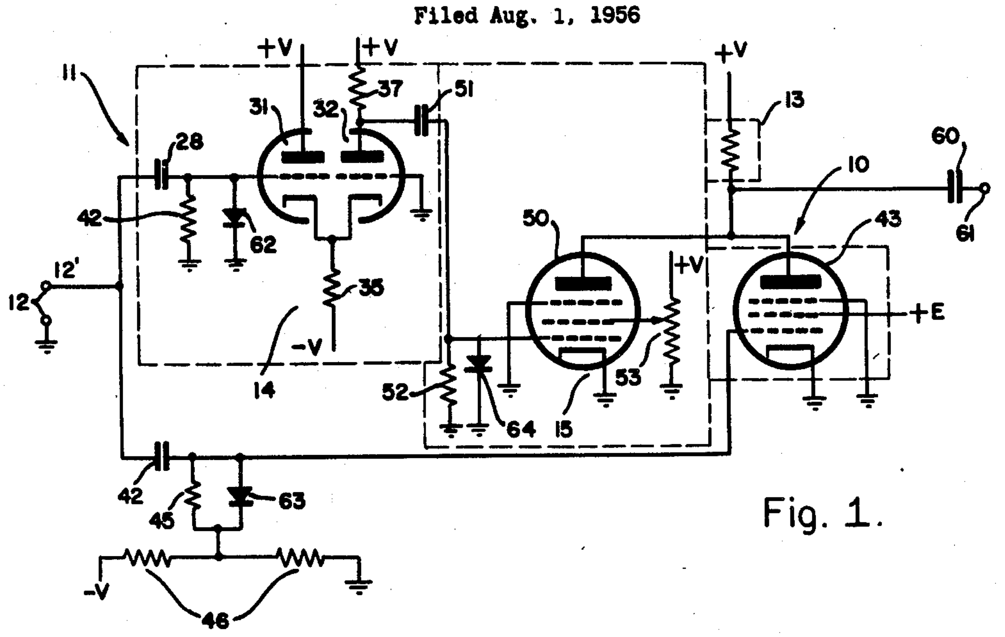

The present invention relates to video amplifiers, and more particularly to a video amplifier whose output voltage is a semi-logarithmic function of applied input signal.

The utility of an amplifier displaying a logarithmic response to applied input signals has long been recognized in the electronic art. Such an amplifier would, for example, respond to applied input signals having a constant ratio of A.C. root mean square to direct current value by developing an output signal having a substantially constant amplitude alternating current component for any value of applied input signal. Inasmuch as certain classes of signal noise are characterized by such a constant ratio, it is theoretically possible, through the use of a logarithmic amplifier, to modify such noise signals to have a constant alternating current component regardless of the amplitude of the noise signal.

On the other hand, the fact that the logarithms, to any base, of the numbers between zero and one vary between negative infinity and zero has made the practical realization of a truly logarithmic amplifier an impossibility. While several types of vacuum tubes display a substantially logarithmic response to applied input signal over a restricted range, the response of amplifiers including such tubes to signals smaller than a preselected value is not generally contemplated, and may in fact depart widely from the desired response.

The preselected value above which truly logarithmic response is achieved may be made arbitrarily small by including additional stages of gain in the amplifier, but none of the logarithmic amplifiers heretofore proposed have contemplated approximating a logarithmic response for values of input signal less than the preselected value.

It is therefore an object of the present invention to provide a video amplifier whose output voltage is a linear function of applied input signals up to a crossover voltage and a logarithmic function of input voltage for values of input signal greater than the crossover voltage whereby the amplifier displays a semi-logarithmic response approximating a truly logarithmic response over a much greater range than that heretofore achieved in the art.

A further object of the present invention is to provide an improved video amplifier which responds to applied input signals having a constant ratio of alternating current root mean square voltage to direct current voltage to develop output signals having a substantially constant alternating current component over an extended range of amplitude variations of the applied input signal.

A further object of the present invention is to provide an amplifier having the response described which is simple to construct and adjust, and highly stable in operation, yet requiring only a minimum of relatively inexpensive parts.

A video amplifier, according to the present invention, comprises a linear amplifier and a logarithmic amplifier having their input and output circuits connected in parallel so that the same input signal is applied to both amplifiers while the output signal is taken as the sum of the output signals from each amplifier. The logarithmic amplifier is adjusted to provide an output signal which is a logarithmic function of applied input signals for input signals greater than a preselected crossover voltage. The linear amplifier is adjusted to provide an output signal which is a linear function of the applied input signals for input signals between zero and the crossover voltage, and a constant level of output signal for input signals greater than the crossover voltage. When the gain levels of each stage are properly adjusted, the resultant output signal is found to be a semi-logarithmic function of applied input signals and closely approximating a truly logarithmic response.

Figure 2:
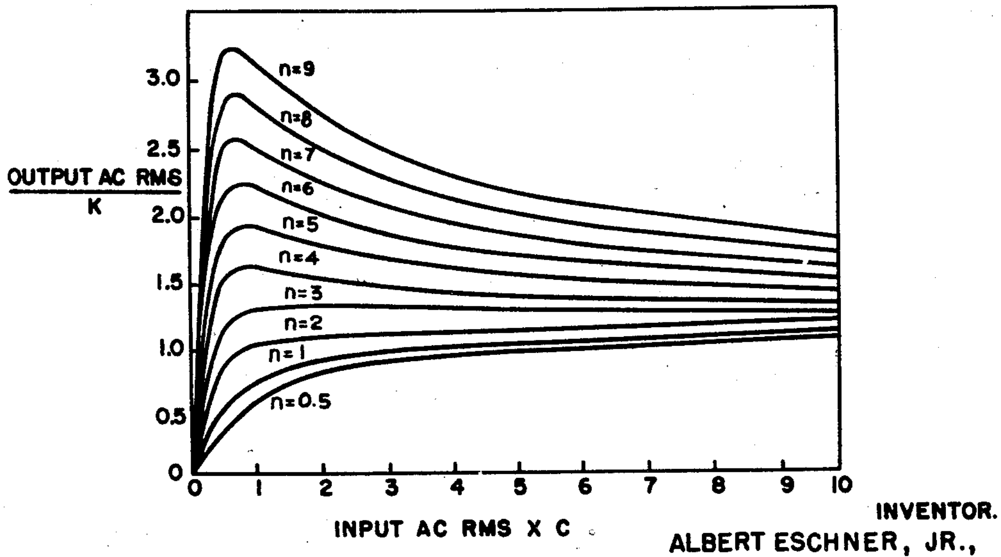

The novel features which are believed to be characteristic of the invention, both as to its organization and method of operation, together with further objects and advantages thereof, will be better understood from the following description considered in connection with the accompanying drawing in which:

Fig. 1 is a schematic circuit diagram of a logarithmic video amplifier provided in accordance with the present invention; and Fig. 2 is a graph showing curves useful in explaining the operation of the embodiment of Fig. 1.

Referring now to the schematic circuit diagram shown in Fig. 1, a video amplifier, according to the present invention, comprises a logarithmic amplifier 10 and a linear amplifier 11 having their input circuits connected in parallel for receiving input signals applied to a pair of input terminals 12. The output circuits of each of the amplifiers 10 and 11 are connected to develop their output signals across a common summing load device, such as the load resistor 13, across which output signals from the amplifier may be taken. More particularly, the logarithmic amplifier 10 is responsive to applied input signals greater in an absolute sense than $1/C$, defined as the crossover voltage, to produce an output signal which is a logarithmic function of the applied input signal. The linear amplifier 11 comprises an amplifying stage 14 and a limiting stage 15 and is responsive to applied input signals for producing output signals which are a linear function of applied input signals between zero and the crossover voltage, and of constant amplitude for input signals greater in an absolute sense than the crossover voltage. In the analysis which follows, and in particular, with reference to Fig. 2, the gain of the linear amplifier 11 should be adjusted to equal $KnC$, where K is the desired gain of the video amplifier, $1/C$ is the crossover voltage previously defined, and $n$ is the ratio of the gain of the linear amplifier 11 to the gain of the logarithmic amplifier 10 at the crossover voltage. If the two amplifiers 10 and 11 are adjusted in this manner, the output signals developed across the common load resistor 13 may be expressed by the equations, $$e_2 = KnC|e_1| \text{ for } 0 \leq |e_1| \leq 1/C \quad (1)$$

$$e_2 = K(n + \ln C|e_1|) \text{ for } 1/C \leq |e_1| \quad (2)$$

where $e_2$ is the output voltage, and $e_1$ is the input voltage. For the embodiment of the present invention shown in Fig. 1, and described herein, it is necessary that the input signals $e$, be of negative polarity.

The effect of variations in the coefficients $n$ and C on the response of the video amplifier of the present invention may be conveniently represented by means of a graph such as that shown in Fig. 2, which is a plot of output A.C. R.M.S. voltage/$K$ as ordinate v. input A.C. R.M.S. voltage$\times C$ as abscissa, where the input signal is a folded Gaussian noise signal having a constant ratio of A.C. R.M.S. to D.C. value for various values of $n$.

The curves will thus be seen to represent the degree to which a truly logarithmic response is achieved. Ideally, the curves should correspond to a straight line parallel to the horizontal axis of the graph and the degree to which such an ideal is achieved may be considered to be represented by the closeness with which the curves depicted in Fig. 2 approximate such a straight line. It will be seen that for values of $n$ greater than 7, the curve drops more than three decibels from its peak value for example. It has been found that suitable values of $n$ for most applications may be taken between the values $n$ equal to 3 and $n$ equal to 7. It should be understood that different values of C and $n$ may be desirable where input signals having different noise characteristics are to be modified so as to produce substantially constant A.C. signals at the output of the video amplifier.

The response thus described may be realized by utilizing a linear amplifying stage for the amplifying stage 14, a sharp cutoff pentode for the limiting stage 15 and a remote cutoff pentode for the logarithmic amplifier 10, as shown in greater detail in the diagram. The linear amplifying stage 14 includes a pair of electron discharge devices such as the triodes 31 and 32, each having a grid, cathode and anode, respectively. The cathodes of the triodes 31 and 32 are connected to gether and through a cathode resistor 35 to the negative terminal of a source potential —V, not otherwise specified. The anode of the triode 31 is connected directly to the positive terminal of a source of potential +V, while the anode of the triode 32 is returned to the +V supply through a load resistor 37. The grid of triode 32 is connected to ground, while the grid of the triode 31 is connected through a coupling capacitor 28 to the input terminal 12′, and to ground through a grid bias resistor 42. The input signals of negative polarity to be amplified by the video amplifier are applied between the input terminal 12′ and ground. The interconnection of the triodes 31 and 32, as specified, will readily be recognized to correspond to the conventional cathode-coupled linear amplifier configuration.

The input signals applied to the input terminals 12 are also applied through a coupling capacitor 42 to the control grid of a remote cutoff pentode amplifying tube 43. A biasing voltage for the tube 43 is provided by a grid bias resistor 45 connected between the grid and a tap on a voltage divider 46. One end of the voltage divider 46 is connected to ground, while the other end of the divider 46 is returned to the negative terminal of the source of potential, —V. The anode of the tube 43 is connected to the positive terminal of the source of potential +V through the load resistor 13, across which the output signal for the video amplifier is developed. The suppressor grid and cathodes of the tube 43 are each connected to ground, while the screen grid of the tube is returned to the positive terminal of the source of regulated potential +E, not otherwise specified. The potential +E and the tap on the voltage divider 46 should be adjusted and positioned to bias the tube 43 to produce a logarithmic response over at least a portion of its input-output curve.

The output signals developed by the linear amplifier stage 14 across its load resistor 37 are applied to the grid of a sharp cutoff pentode tube 50 through a coupling capacitor 51, the grid being returned to ground through a grid biasing resistor 52. The cathode and the suppressor grid of the tube 50 are connected to ground, while the screen grid is connected to the movable tap of a voltage divider 53. One end of the divider 53 is connected to ground, while the other end is returned to the positive terminal of the source of potential +V. The movable tap on the voltage divider 53 may be used to adjust the parameter $n$ in a manner to be described hereinafter. The anode of the tube 50 is connected to thes anode of the tube 43.

When connected in this manner, the output signals developed by each of the tubes 43 and 50 in response to the input signal applied to its grid is developed across the same load resistor 13 and, accordingly, the output signal from the amplifier will correspond to the sum of the output signals developed across the load resistor 13 by each of the tubes 43 and 50. The output signal appearing across this resistor is then at a direct current potential above ground. If it is desired to remove this direct current component, use may be made of an output coupling capacitor 60 to interconnect the anodes and the output terminals 61 of the amplifier.

In addition to the elements described, the circuit shown in the figure includes three diodes 62, 63 and 64, connected across the resistors 42, 45 and 52, respectively. These diodes function as grid-clamping diodes to enable the amplifier to function on pulse-type input signals in a conventional and well-known manner. If the input signals applied to the terminals 12 are not of pulse or intermittent form, the diodes may be replaced by direct coupling between stages, or, alternatively, other biasing schemes suitable for establishing appropriate D.C. levels at the inputs to each of the tubes may be utilized.

Considering now the adjustment and response of the circuit thus described, the input video signal applied to the input terminals 12 and the grids of each of the tubes 31 and 43, for the diode polarity shown in Fig. 1, are assumed to have a negative polarity and to be applied at the proper bias levels to the control grids of each of the tubes. The tube 43, being a remote cutoff pentode, with proper grid bias voltages will pass an output current through the load resistor 13 which is a logarithmic function of the input signal applied to its grid. This logarithmic response will ordinarily hold only a restricted range of input signal amplitude from a certain maximum to minimum range in an algebraic sense. Since it is desirable to utilize as much of the range of logarithmic response of the tube as is available, the crossover point defined in connection with the discussion of Equations 1 and 2 will ordinarily be selected to correspond to minimum input signals for which the tube displays a logarithmic response. The tube 50, on the other hand, a sharp cutoff pentode, will display a substantially linear response to an applied input signal, up to its cutoff voltage, corresponding to a particular value of applied grid potential. In order to insure that the tube 50 is cut off at the value of input signal voltage at which the tube 43 begins to display its logarithmic response, the gain of the amplifying stage 14 is adjusted to provide a gain which will insure that this cutoff voltage is applied to the tube 50 when the value of input signal applied to terminals 12 corresponds to the value at which the tube 43 begins to display a logarithmic response.

In order to provide for adjustment of the coefficient $n$ in Equations 1 and 2, the screen voltage of the tube 50 is adjusted to make the gain of the stage correspond to the value required to give the desired value of $n$. Adjustment of the potential of the screen of the tube 50 will ordinarily affect the cutoff potential of the tube and, accordingly, the gain adjustment is oridinarily made before a determination is made of the gain required for the linear amplifier 14. This gain may be calculated in the manner set forth above.

An amplifier constructed in accordance with the present invention included the following circuit values and tube types.

| | |
|---|---|
| Tubes 31 and 32 | Type 5670. |
| Tube 50 | Type 6136. |
| Tube 43 | Type 5749. |
| Resistor 35 | 9000 ohms. |
| Resistor 37 | 2200 ohms. |
| Resistor 13 | 2000 ohms. |
| Potential sources: | |
| +V | 150 volts. |
| —V | —140 volts. |
| +E | +90 volts. |

The circuit constants were adjusted to provide equal potentials on the screen grids of both of tubes 43 and 50. Since tube 43 displayed a logarithmic response between −1 and −16 volts, the linear amplifier 11 was set to cut off at −1 volt. The amplifier stage 14 was arranged to have a stage gain of 4 since tube 50 cut off at −4 volts for the circuit values given.

The resulting amplifier maintained an output A.C. root mean square voltage constant within 3 db as a noisy input signal, with folded Gaussian amplitude distribution, varied over a range of 25 db.

What is claimed is:

1. A video amplifier for producing an output signal which is a substantially logarithmic function of an applied input signal comprising: a logarithmic amplifying stage having an input terminal and an output terminal and being responsive to applied input signals exceeding a crossover voltage for producing an output signal which is a logarithmic function of applied input signals; a linear amplifying stage having an input terminal and an output terminal and being responsive to applied input signals less than said crossover voltage for producing an output signal which is a linear function of applied input signals and to applied input signals exceeding said crossover voltage for producing an output signal having a constant amplitude; first means interconnecting the input terminals of said logarithmic amplifying stage and said linear amplifying stage, said first means comprising the input of said video amplifier; second means interconnecting the output terminals of said logarithmic amplifying stage and said linear amplifying stage, said second means comprising the output of said video amplifier.

2. The video amplifier set forth in claim 1, wherein said logarithmic amplifying stage includes a remote cutoff pentode electron discharge device.

3. The video amplifier set forth in claim 1, wherein said linear amplifying stage includes a sharp cutoff pentode electron discharge device.

4. A video amplifier having an input terminal and an output terminal and being responsive to input signals applied to said input terminal for producing an output signal on said output terminal which is a semi-logarithmic function of applied input signals, said video amplifier comprising: a logarithmic amplifying stage having its input connected to said input terminal and its output connected to said output terminal and operative above a selected cross-over level of input signals; and a linear amplifying stage having its input connected to said input terminal and its output connected to said output terminal and operative up to said cross-over level, said logarithmic and linear amplifying stages forming parallel amplifying paths between said input and said output terminals.

5. The video amplifier set forth in claim 4, wherein said logarithmic amplifying stage is selected to produce output signals on its output which are a logarithmic function of applied input signals for applied input signals exceeding a crossover voltage, and said linear amplifying stage is adjusted to produce output signals on its output which are a linear function of applied input signals for input signals between zero and said crossover voltage, and output signals of constant amplitude for input signals exceeding said crossover voltage.

6. A video amplifier having an input terminal and an output terminal and being responsive to input signals applied to said input terminal for producing output signals on said output terminal which are a semi-logarithmic function applied input signals, said video amplifier comprising: first amplifying means having its input connected to said input terminal and its output connected to said output terminal and including means for being responsive to input signals applied to its input for producing output signals which are a logarithmic function of applied input signals for input signals exceeding a preselected crossover voltage; and second amplifying means having its input and output connected in parallel with the input and output, respectively, of said first amplifying means, said second amplifying means being responsive to input signals applied to its input for producing output signals which are a linear function of applied input signals for input signals less than said crossover voltage and output signals of constant amplitude for input signals greater than said crossover voltage, and switching means connected for controlling said second amplifying means when said input signals exceed said crossover voltage to render said second amplifying means inoperative for forming said output signals which are a linear function of said applied input signals.

7. The video amplifier set forth in claim 6, wherein said first amplifying means includes a remote cutoff pentode biased to have a logarithmic response to applied input signals over at least a portion of its response curve, and said second amplifying means includes a sharp cutoff pentode tube for limiting the output of said second amplifying stage at said crossover voltage.

8. The video amplifier set forth in claim 6, wherein the ratio of the gain of said second amplifying means to the gain of said first amplifying means at the crossover voltage is greater than one.

References Cited in the file of this patent

UNITED STATES PATENTS

| | | |
|---|---|---|
| 2,244,695 | Hathaway | June 10, 1941 |
| 2,577,506 | Belleville | Dec. 4, 1951 |
| 2,695,338 | Doriot et al. | Nov. 23, 1954 |

FOREIGN PATENTS

| | | |
|---|---|---|
| 155,744 | Australia | Mar. 18, 1954 |